(Model.)
M. R. MARTIN.
Corn Planter.
No. 233,784. Patented Oct. 26, 1880.
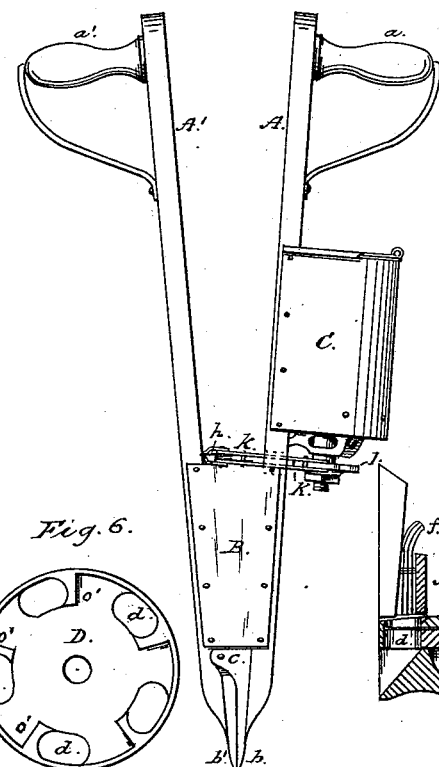
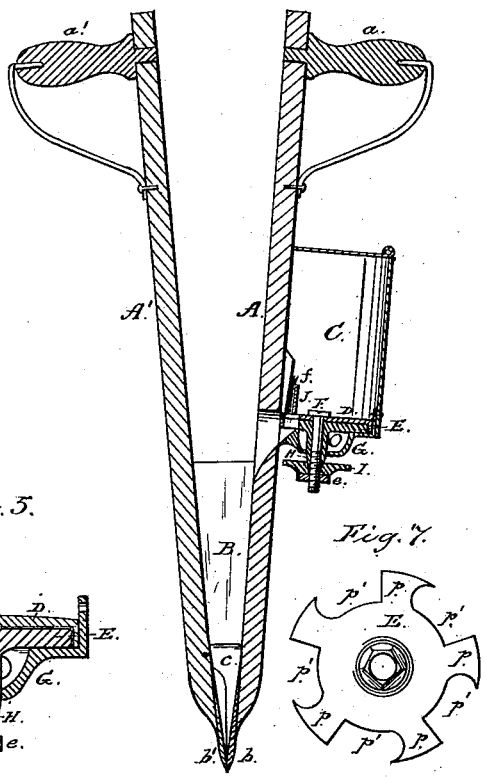
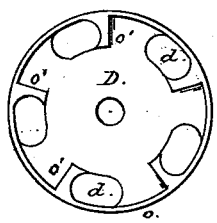
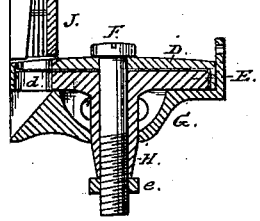
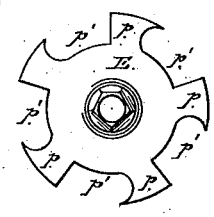
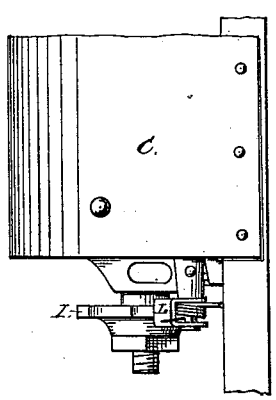
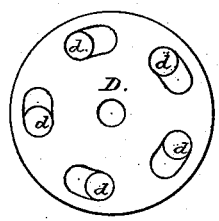
Attest:
F. W. Howard
James A. Payne
Inventor:
Myron R. Martin
by Dyer & Wilber
attys.

UNITED STATES PATENT OFFICE.

MYRON R. MARTIN, OF BROOKLYN, WISCONSIN.

CORN-PLANTER.

SPECIFICATION forming part of Letters Patent No. 233,784, dated October 26, 1880.

Application filed March 4, 1880. (Model.)

*To all whom it may concern:*

Be it known that I, MYRON R. MARTIN, of Brooklyn, in the county of Green and State of Wisconsin, have invented a new and useful Improvement in Rotary-Drop Hand Corn-Planters; and I do hereby declare that the following is a full and exact description of the same, reference being had to the accompanying drawings, and to the letters of reference marked thereon.

My invention relates to improvements in rotary-drop corn-planters; and the novelty therein consists, mainly, in the new combination of the several operative parts, all constructed and arranged as more fully hereinafter described.

In order that those skilled in the art may know how to make and use my improvement, I proceed to describe the same, having reference to the accompanying drawings, in which—

Figure 1 is an elevation of the improvement; Fig. 2, a central vertical section of the same; Fig. 3, a side view of the bottom part of the seed-cup with its operative mechanism on an enlarged scale; and Figs. 4, 5, 6, and 7 are detailed views, on an enlarged scale, of the seed-feeding device.

Similar letters denote corresponding parts in each figure.

In the drawings, A A' denote the lever-arms, each of which is supplied with proper handles, $a$ $a'$, by means of which the implement is grasped and operated with both hands. The lower ends of the lever-arms A A' are supplemented and protected by chisel-shaped metal points $b$ $b'$, one of which has ears or lugs $c$, by means of which the two lever-arms are pivoted together at such a distance apart as permits the passage of seed between them.

When the handles of the lever-arms are separated the lower ends, $b$ $b'$, are closed together, presenting the metallic lower ends ready for convenient insertion into the ground, and when the handles are closed together then these lower ends or jaws are open and permit the seed to be deposited in the ground. The seed in its passage down to these jaws is kept from escaping from between the lever-arms by the covering-pieces B, made of any suitable flexible material. The seed-cup C, of convenient size and form, is fastened to one of these levers, having a removable or hinged cover adapted to be closed by any convenient spring.

The bottom of the seed-cup is formed by a casting, G, with a part of its periphery flat for attachment to one of the levers, the remainder of its periphery being provided with an upwardly-extending flange forming a chamber, within which rotates the seed-feeding device. This feeding device consists of plates D and E. Plate D is made with a downwardly-extending flange, $o$, around its periphery, and is provided with apertures $d$, on one side of which flanges $o'$ $o'$ extend from $o$. Plate E is cast with a sleeve or casing, H, which, when the parts are in position, extends through and beyond the casting G, and with projections $p$ $p$, forming a series of recesses, $p'$ $p'$, on its periphery.

When the plate E is placed within the chamber formed by the flange $o$ of plate D the projections $p$ and body of the plate, with flanges $o'$ $o'$, form sides of seed-recesses, and as E may be moved within certain limits within casting G the sizes of these recesses may be varied, a greater or less or no portion of the projection $p$ covering the openings $d$.

The plates D and E are held together by a bolt, F, and nut $e$, and rotate in the casting G.

The bolt F, before spoken of, passes down through the seed-plates D and E, within the sleeve H, which, in turn, passes through the casting G, and has at its bottom a ratchet-wheel, I, secured upon or against said sleeve, so that in its rotation it turns said sleeve and also the pivotal bolt F, and is held up to its work by a nut, $e$, upon the lower end of the bolt F, which nut at the same time holds the plates D and E together at the desired capacity of seed-recess, and causes them to be revolved by the revolution of the ratchet-wheel before named. These seed-plates D and E are held from displacement upwardly by a casting, J, secured to the outside of one of the lever-arms and within the seed-cup, which casting has outwardly-beveled flanges, which serve to direct the seed upon the surface of the plate D, and has passing through it a brush, $f$, placed so as to limit the passage of seed out of the seed-cup into the jaws of the planter.

Rotation in one direction of the ratchet-wheel I is effected by a lever, K, made with two parallel arms arranged a sufficient distance apart to embrace the periphery of the ratchet-wheel, and having a cross-pin which engages with the ratchets on the ratchet-wheel before named. This ratchet-lever K is pivoted to the inside of one of the arms, A, in such a manner as to have a movement both vertical and horizontal, and is held up to its work of engagement with the ratchet-wheel by means of a spring, $h$.

In order to prevent the ratchet-wheel I from rotating in the opposite direction a spring-pawl, L, is placed on the side of the ratchet-wheel opposite to that where the levers K are placed, which pawl catches against every ratchet in the revolution of the wheel and prevents its turning backward. Now, if the seed-cup is filled with seed and the lever-arms A A' are spread apart, the jaws $b\ b'$ are closed together, and the implement is thrust into the ground the required distance. The handles then being closed together the proper portion of seed which had been before discharged out of the seed-box will be deposited in the ground. The handles being then separated again causes the withdrawal of the ratchet-lever K, which engages with the ratchet-wheel I and turns that, and also the seed-plates D and E a sufficient distance to allow of one of the seed-recesses $d$ to pass under the brush in the casting J, and through an opening in one of the lever-arms down to the jaws, ready to be deposited in the ground when the handles are next brought together.

The principal implement, as illustrated in the drawings, is designed for the planting of corn; but it is evident that such modifications may be made without invention as will fit it for the planting of other seeds, as the seed-plates may be readily adjusted or removed and others supplied in their places, the nut $e$ permitting of the proper adjustment of seed-recesses and the use of plates of different thicknesses.

The advantages of my implement consist in its simplicity, its accuracy in dropping, its certainty of movement, and its capacity for convenient adjustment.

Having thus described my invention, what I claim as new therein is—

1. The combination, in a hand corn-planter, of the seed-cup C, the casting J, the plates D E, the sleeve H, the ratchet-wheel I, the bolt F with the nut $e$, and the brush $f$, the several parts constructed and arranged to operate substantially as set forth.

2. The combination, in a hand corn-planter, of the plates D E, the casting G, the sleeve H, the ratchet-wheel I, and the bolt F, with the nut $e$, with the handles A A', the lever K, the spring $h$, the ratchet, and the spring-pawl L, the several parts constructed and arranged to operate substantially as set forth.

This specification signed and witnessed this 2d day of February, 1880.

MYRON RUFUS MARTIN.

Witnesses:
CHAS. W. DENNIS,
E. W. PALMER.